(12) United States Patent
Komada et al.

(10) Patent No.: US 12,304,589 B2
(45) Date of Patent: May 20, 2025

(54) OPERATING DEVICE FOR HUMAN-POWERED VEHICLE

(71) Applicant: SHIMANO INC., Sakai (JP)

(72) Inventors: Yasuyuki Komada, Sakai (JP); Kodai Hirota, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 18/464,271

(22) Filed: Sep. 11, 2023

(65) Prior Publication Data

US 2024/0109619 A1 Apr. 4, 2024

(30) Foreign Application Priority Data

Sep. 30, 2022 (DE) ...................... 10 2022 125 308.2

(51) Int. Cl.
  *B62K 23/06* (2006.01)
  *B62L 3/02* (2006.01)
  *B62M 25/08* (2006.01)

(52) U.S. Cl.
  CPC .............. *B62K 23/06* (2013.01); *B62L 3/023* (2013.01); *B62M 25/08* (2013.01)

(58) Field of Classification Search
  CPC ..................................................... B62M 25/08
  See application file for complete search history.

(56) References Cited

U.S. PATENT DOCUMENTS

| | | | |
|---|---|---|---|
| 10,894,578 B2 | 1/2021 | Cahan et al. | |
| 2015/0001018 A1* | 1/2015 | Kariyama | B62L 3/023 188/344 |
| 2018/0001956 A1* | 1/2018 | Komada | B62K 23/06 |
| 2018/0057103 A1* | 3/2018 | Komatsu | F15B 7/08 |
| 2021/0139102 A1* | 5/2021 | Komada | B62L 3/026 |
| 2021/0139105 A1* | 5/2021 | Komada | B62K 23/06 |
| 2021/0144453 A1* | 5/2021 | Komada | B62K 19/36 |
| 2021/0339818 A1* | 11/2021 | Komada | B62L 3/02 |
| 2021/0339819 A1* | 11/2021 | Hidaka | B62K 23/06 |
| 2022/0063754 A1* | 3/2022 | Masuda | B60L 50/66 |
| 2022/0306231 A1* | 9/2022 | Hidaka | B62L 3/023 |
| 2022/0306236 A1* | 9/2022 | Hidaka | B62J 45/00 |

FOREIGN PATENT DOCUMENTS

| | | | | |
|---|---|---|---|---|
| DE | 102013222856 A1 | * | 6/2014 | ............ B62K 23/06 |
| DE | 102019130398 A1 | * | 5/2021 | ............ B62K 21/26 |
| DE | 102020129331 A1 | * | 5/2021 | ............ B62J 1/08 |

* cited by examiner

Primary Examiner — Daniel D Yabut
(74) Attorney, Agent, or Firm — MORI & WARD, LLP

(57) ABSTRACT

An operating device for a human-powered vehicle comprises a base member, an operating member, an electronic component, and a reinforcement member. The base member includes a first end portion and a second end portion and extends between the first end portion and the second end portion in a longitudinal direction. The first end portion is configured to be coupled to a vehicle body of the human-powered vehicle. The second end portion includes an internal space. The operating member is movably coupled to the base member. The electronic component is provided in the internal space of the second end portion. The reinforcement member is coupled to the second end portion. The reinforcement member is a separate member from the second end portion. The reinforcement member is at least partially provided between the second end portion and the operating member.

25 Claims, 7 Drawing Sheets

OPERATING DEVICE FOR HUMAN-POWERED VEHICLE

CROSS-REFERENCE TO RELATED APPLICATIONS

The present application claims priority under 35 U.S.C. § 119 to German Patent Application No. 10 2022 125 308.2, filed Sep. 30, 2022. The contents of German Patent Application No. 10 2022 125 308.2 are incorporated herein by reference in their entirety.

BACKGROUND

Technical Field

The present invention relates to an operating device for a human-powered vehicle.

Background Information

A human-powered vehicle includes an operating unit including a base part, an operating part, and an electronic element. The electronic element is at least partially provided in the base part. The operating unit may come into contact an object such a road and another human-powered vehicle. It is preferable to reduce a risk of damage of the electronic element caused by contact between the operating unit and the object.

SUMMARY

In accordance with a first aspect of the present invention, an operating device for a human-powered vehicle comprises a base member, an operating member, an electronic component, and a reinforcement member. The base member includes a first end portion and a second end portion and extends between the first end portion and the second end portion in a longitudinal direction. The first end portion is configured to be coupled to a vehicle body of the human-powered vehicle. The second end portion includes an internal space. The operating member is movably coupled to the base member. The electronic component is provided in the internal space of the second end portion. The reinforcement member is coupled to the second end portion. The reinforcement member is a separate member from the second end portion. The reinforcement member is at least partially provided between the second end portion and the operating member.

With the operating device according to the first aspect, the reinforcement member reinforces the second end portion of the base member, reducing the risk of damage of the second end portion caused by contact between the operating device and an object such as a road and another human-powered vehicle. Thus, the reinforcement member can reduce the risk of or prevent damage of the electronic component caused by the contact between the operating device and the other object.

In accordance with a second aspect of the present invention, the operating device according to the first aspect is configured so that the operating member is movable relative to the base member between a rest position and an operated position. The reinforcement member is at least partially provided between the second end portion and the operating member in at least one of a rest state where the operating member is in the rest position and an operated state where the operating member is in the operated position.

With the operating device according to the second aspect, it is possible to enlarge a region where the reinforcement member covers the second end portion. Thus, the reinforcement member reliably reinforces the second end portion of the base member, reducing reliably the risk of damage of the second end portion caused by contact between the operating device and the object. Accordingly, the reinforcement member can reliably reduce the risk of or prevent damage of the electronic component caused by the contact between the operating device and the object.

In accordance with a third aspect of the present invention, the operating device according to the first or second aspect is configured so that the operating member is pivotally coupled to the base member about a pivot axis.

With the operating device according to the third aspect, it is possible to apply the reinforcement member to the base member to which the operating member is pivotally coupled.

In accordance with a fourth aspect of the present invention, the operating device according to the third aspect is configured so that the second end portion includes a first support and a second support spaced apart from the first support in an axial direction defined along the pivot axis. The reinforcement member is at least partially provided between the first support and the second support in the axial direction.

With the operating device according to the fourth aspect, it is possible to enlarge a region where the reinforcement member covers the second end portion. Thus, the reinforcement member reliably reinforces the second end portion of the base member, reducing reliably the risk of damage of the second end portion caused by contact between the operating device and the object. Accordingly, the reinforcement member can reliably reduce the risk of or prevent damage of the electronic component caused by the contact between the operating device and the object.

In accordance with a fifth aspect of the present invention, the operating device according to the fourth aspect is configured so that the operating member is at least partially provided between the first support and the second support in the axial direction.

With the operating device according to the fifth aspect, it is possible to support the operating member using the first support and the second support. Thus, it is possible to reduce the risk of or prevent damage of the electronic component caused by the contact between the operating device and the object.

In accordance with a sixth aspect of the present invention, the operating device according to any one of the fourth to seventh aspects is configured so that the reinforcement member includes a reinforcement frame coupling the first support and the second support.

With the operating device according to the sixth aspect, the reinforcement frame reinforces the first support and the second support. Thus, it is possible to reduce reliably the risk of damage of the second end portion caused by contact between the operating device and the object. Accordingly, the reinforcement member can reliably reduce the risk of or prevent damage of the electronic component caused by the contact between the operating device and the object.

In accordance with a seventh aspect of the present invention, the operating device according to the sixth aspect is configured so that the reinforcement frame includes a first frame part, a second frame part, and a third frame part. The first frame part is coupled to the first support. The second frame part is coupled to the second support. The third frame part is provided between the first frame part and the second frame part and couples the first frame part and the second frame part.

With the operating device according to the seventh aspect, the reinforcement frame reliably reinforces the second end portion. Thus, it is possible to reduce more reliably the risk of damage of the second end portion caused by contact between the operating device and the object. Accordingly, the reinforcement member can more reliably reduce the risk of or prevent damage of the electronic component caused by the contact between the operating device and the object.

In accordance with an eighth aspect of the present invention, the operating device according to the seventh aspect is configured so that the third frame part is integrally provided with at least one of the first frame part and the second frame part as a one-piece unitary member.

With the operating device according to the eighth aspect, it is possible to improve rigidity of the reinforcement member. Thus, the reinforcement member can more reliably reduce the risk of or prevent damage of the electronic component caused by the contact between the operating device and the object.

In accordance with a ninth aspect of the present invention, the operating device according to the seventh or eighth aspect is configured so that the third frame part is at least partially provided between the first support and the second support in the axial direction.

With the operating device according to the ninth aspect, it is possible to enlarge a region where the reinforcement member covers the second end portion. Thus, the reinforcement member reliably reinforces the second end portion of the base member, reducing reliably the risk of damage of the second end portion caused by contact between the operating device and the object. Accordingly, the reinforcement member can reliably reduce the risk of or prevent damage of the electronic component caused by the contact between the operating device and the object.

In accordance with a tenth aspect of the present invention, the operating device according to any one of the sixth to ninth aspects is configured so that the reinforcement member includes a reinforcement rod coupling the first support and the second support.

With the operating device according to the tenth aspect, the reinforcement rod improves the rigidity of the first support and the second support. Thus, the reinforcement rod can reduce the risk of or prevent damage of the electronic component caused by the contact between the operating device and the object.

In accordance with an eleventh aspect of the present invention, the operating device according to the tenth aspect is configured so that the first support includes a first hole. The second support includes a second hole. The reinforcement rod extends through the first hole and the second hole.

With the operating device according to the eleventh aspect, the reinforcement rod can reduce the risk of or prevent damage of the electronic component caused by the contact between the operating device and the object with a comparatively simple structure.

In accordance with a twelfth aspect of the present invention, the operating device according to the tenth or eleventh aspect is configured so that the reinforcement frame includes a coupling hole. The reinforcement rod extends through the coupling hole of the reinforcement frame.

With the operating device according to the twelfth aspect, it is possible to couple the reinforcement frame and the second end portion with a comparative simple structure.

In accordance with a thirteenth aspect of the present invention, the operating device according to any one of the fourth to twelfth aspects is configured so that the second end portion includes an accommodating part including the internal space. The accommodating part is coupled to at least one of the first support and the second support.

With the operating device according to the thirteenth aspect, it is possible to provide the internal space to the second end portion with a comparative simple structure.

In accordance with a fourteenth aspect of the present invention, the operating device according to the thirteenth aspect is configured so that the accommodating part is a separate member from at least one of the first support and the second support.

With the operating device according to the fourteenth aspect, it is possible to improve flexibility of a material of the accommodating part. Thus, it is possible to make the accommodating part using the material which is preferable for the electronic component while it is possible to reduce the risk of or prevent damage of the electronic component caused by the contact between the operating device and the object.

In accordance with a fifteenth aspect of the present invention, the operating device according to the thirteenth or fourteenth aspect is configured so that the reinforcement member is at least partially provided between the accommodating part and the operating member.

With the operating device according to the fifteenth aspect, it is possible to enlarge a region where the reinforcement member covers the second end portion. Thus, the reinforcement member reliably reinforces the second end portion of the base member, reducing reliably the risk of damage of the second end portion caused by contact between the operating device and the object. Accordingly, the reinforcement member can reliably reduce the risk of or prevent damage of the electronic component caused by the contact between the operating device and the object.

In accordance with a sixteenth aspect of the present invention, the operating device according to any one of the third to fifteenth aspects is configured so that the reinforcement member is closer to the second end portion than the pivot axis.

With the operating device according to the sixteenth aspect, the reinforcement member effectively reinforces the second end portion of the base member, reducing the risk of damage of the second end portion caused by contact between the operating device and the object. Thus, the reinforcement member can reduce the risk of or prevent damage of the electronic component caused by the contact between the operating device and the other object.

In accordance with a seventeenth aspect of the present invention, the operating device according to any one of the first to sixteenth aspects is configured so that the reinforcement member is harder than the base member.

With the operating device according to the seventeenth aspect, the reinforcement member reliably reinforces the second end portion of the base member, reducing reliably the risk of damage of the second end portion caused by contact between the operating device and the object. Thus, the reinforcement member can reliably reduce the risk of or prevent damage of the electronic component caused by the contact between the operating device and the other object.

In accordance with an eighteenth aspect of the present invention, the operating device according to any one of the first to seventeenth aspects is configured so that the reinforcement member is made of a metallic material.

With the operating device according to the eighteenth aspect, the reinforcement member reliably reinforces the second end portion of the base member, reducing reliably the risk of damage of the second end portion caused by contact between the operating device and the object. Thus, the reinforcement member can reliably reduce the risk of or prevent damage of the electronic component caused by the contact between the operating device and the other object.

In accordance with a nineteenth aspect of the present invention, the operating device according to any one of the first to eighteenth aspects is configured so that the reinforcement member is configured to contact the operating member.

With the operating device according to the nineteenth aspect, the reinforcement member can reduce or prevent the operating member from contacting the second end portion when the operating member moves toward the second end portion. Thus, it is possible to reduce the risk of or prevent damage of the second end portion caused by contact between the second end portion and the operating member.

In accordance with a twentieth aspect of the present invention, the operating device according to any one of the first to nineteenth aspects is configured so that the electronic component includes a circuit board.

With the operating device according to the twentieth aspect, it is possible to electrically mount an electronic part on the circuit board, improving design flexibility of the operating device.

In accordance with a twenty-first aspect of the present invention, the operating device according to any one of the first to twentieth aspects is configured so that the base member includes a grip portion provided between the first end portion and the second end portion.

With the operating device according to the twenty-first aspect, it is possible to apply the reinforcement member to the base member (e.g., a base member of an operating device for a road bike) configured to be gripped by a user.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
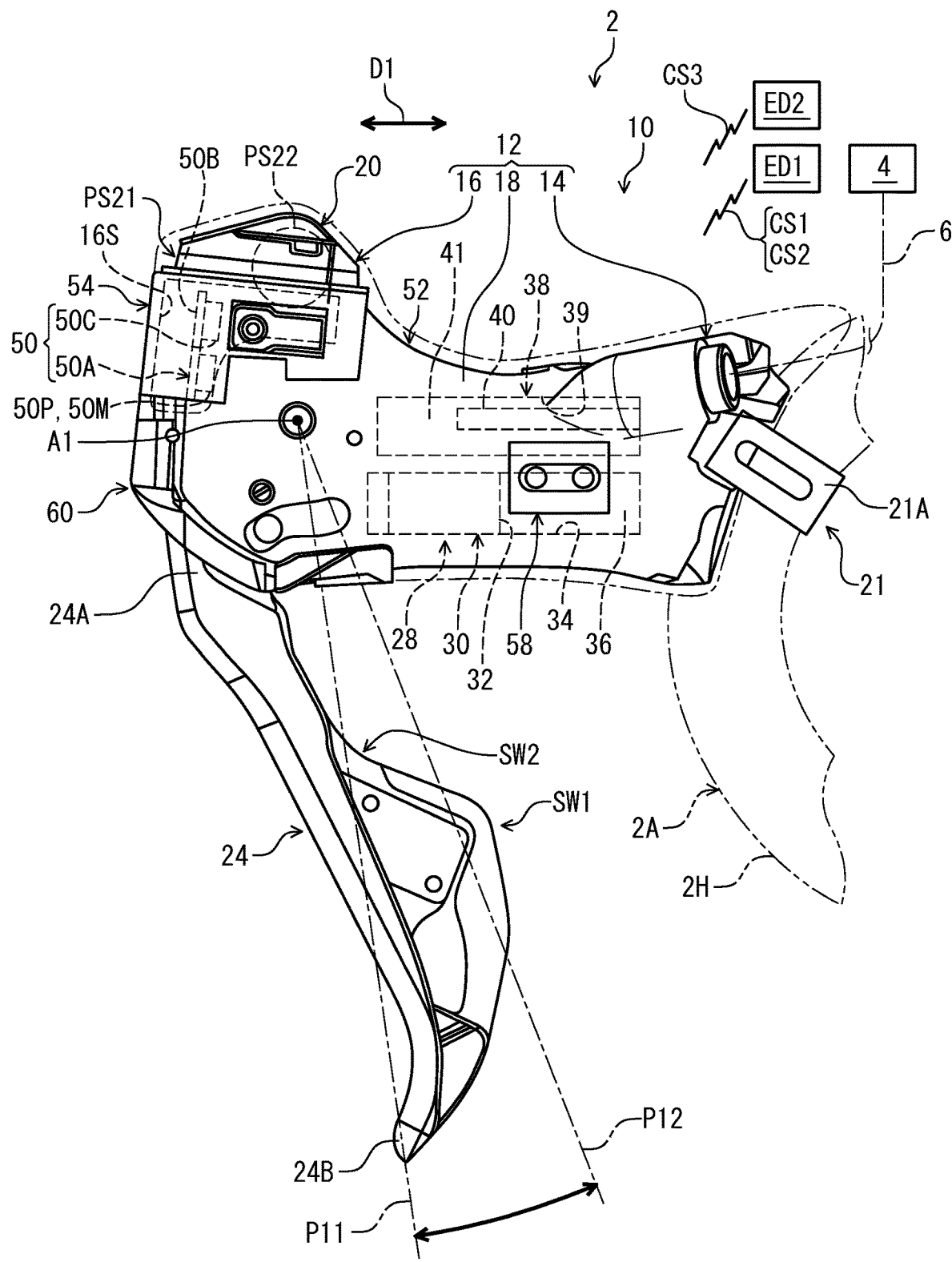
FIG. 1 is a side elevational view of an operating device in accordance with one of embodiments.

The embodiments will now be described with reference to the accompanying drawings, wherein like reference numerals designate corresponding or identical elements throughout the various drawings.

As seen in FIG. 1, a human-powered vehicle 2 includes an operating device 10 in accordance with an embodiment. The operating device 10 is configured to be coupled to a vehicle body 2A of the human-powered vehicle 2. The operating device 10 is configured to be coupled to a handlebar 2H of the vehicle body 2A. The operating device 10 is configured to operate an additional device 4 in response to a user operation. The operating device 10 is configured to be connected to the additional device 4. In the present embodiment, the operating device 10 is configured to be connected to the additional device 4 via a connecting structure 6 such as a hydraulic hose and a mechanical cable. Examples of the additional device 4 include a brake device. However, the operating device 10 can be configured to be connected to another device other than the additional device 4 if needed and/or desired. The additional device 4 can include another device other than a brake device if needed and/or desired.

In the present application, a human-powered vehicle is a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

In the present embodiment, the operating device 10 is a right-hand control device configured to be operated by a user's right hand. However, the operating device 10 can be a left-hand control device configured to be operated by a user's left hand if needed and/or desired.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing the handlebar 2H. Accordingly, these terms, as utilized to describe the operating device 10 or other components, should be interpreted relative to the human-powered vehicle 2 equipped with the operating device 10 as used in an upright riding position on a horizontal surface.

As seen in FIG. 1, the operating device 10 for the human-powered vehicle 2 comprises a base member 12. The base member 12 is configured to be coupled to the vehicle body 2A of the human-powered vehicle 2. In the present embodiment, the base member 12 is configured to be coupled to the handlebar 2H of the vehicle body 2A. However, the operating device 10 can be coupled to other types of handlebars or other parts of the vehicle body 2A.

The base member 12 includes a first end portion 14 and a second end portion 16. The base member 12 extends between the first end portion 14 and the second end portion 16 in a longitudinal direction D1. The first end portion 14 is configured to be coupled to the vehicle body 2A of the human-powered vehicle 2. The first end portion 14 is configured to be coupled to the handlebar 2H of the vehicle body 2A.

In the present embodiment, the base member 12 includes a grip portion 18. The grip portion 18 is provided between the first end portion 14 and the second end portion 16. The grip portion 18 is provided between the first end portion 14 and the second end portion 16 in the longitudinal direction D1. The second end portion 16 includes a pommel portion 20. The pommel portion 20 extends upwardly from the grip portion 18 in a mounting state where the base member 12 is coupled to the vehicle body 2A. However, the shape of the base member 12 is not limited to the illustrated embodiment. The grip portion 18 can be omitted from the base member 12 if needed and/or desired.

The operating device 10 further comprises a mounting structure 21. The mounting structure 21 is configured to couple the first end portion 14 to the handlebar 2H. The mounting structure 21 includes a band clamp 21A. However, the mounting structure 21 can include other structures if needed and/or desired.

The operating device 10 further comprises a cover 22. The cover 22 is configured to be detachably and reattachably attached to the base member 12 to cover the base member 12 at least partially. The cover 22 is made of an elastic material such as rubber. In the present embodiment, the cover 22 is configured to partially cover the base member 12. However, the cover 22 can be configured to entirely cover the base member 12 if needed and/or desired.

The operating device 10 for a human-powered vehicle comprises an operating member 24. The operating member 24 is movably coupled to the base member 12. In the present embodiment, the operating member 24 is pivotally coupled to the base member 12 about a pivot axis A1. The operating member 24 is movable relative to the base member 12 between a rest position P11 and an operated position P12. The operating member 24 is pivotable relative to the base member 12 between the rest position P11 and the operated position P12 about the pivot axis A1. The operating member 24 includes a proximal end and a distal end. The proximal end is closer to the pivot axis A1 than the distal end. However, the operating member 24 can be coupled to the base member 12 in a manner other than a pivotable manner.

In the present application, the term "rest position" as used herein refers to a position at which a movable part such as the operating member 24 remains stationary in a state where the movable part is not operated by the user. The term "operated position" as used herein refers to a position at which the movable part has been operated by the user to perform the operation of the additional device 4.

As seen in FIG. 1, the operating device 10 for the human-powered vehicle 2 comprises an actuator 28. The actuator 28 is at least partially provided in the base member 12. In the present embodiment, the actuator 28 is entirely provided in the base member 12. The actuator 28 is coupled to the operating member 24 to operate the operated device B1 in response to a movement of the operating member 24. However, the actuator 28 can be configured to operate devices other than the operated device B1 if needed and/or desired. The actuator 28 can be partially provided in the base member 12 if needed and/or desired.

In the present embodiment, the actuator 28 includes a hydraulic unit 30. The hydraulic unit 30 includes a piston 32. The base member 12 includes a cylinder hole 34. The piston 32 is movably provided in the cylinder hole 34. The piston 32 is coupled to the operating member 24 to generate a hydraulic pressure in response to the movement of the operating member 24. The base member 12 and the piston 32 define a hydraulic chamber 36. The hydraulic chamber 36 is configured to be connected to the operated device B1 via the hydraulic hose 26. However, the actuator 28 can include other structures such as a cable take-up structure configured to operate an operated device via a mechanical cable (e.g., a Bowden cable).

The hydraulic unit 30 includes a reservoir 38. The base member 12 includes a reservoir recess 39. The reservoir 38 includes a diaphragm 40 provided in the reservoir recess 39. The diaphragm 40 is made on an elastic member such as rubber. The reservoir 38 includes a reservoir chamber 41. The reservoir chamber 41 is configured to be in communication with the hydraulic chamber 36 of the hydraulic unit 30. However, the reservoir 38 can be omitted from the hydraulic unit 30 if needed and/or desired.

The operating device 10 is configured to be electrically connected to electrical devices ED1 and ED2. In the present embodiment, the operating device 10 is configured to be electrically connected to the electrical devices ED1 and ED2 through a wireless communication channel. Examples of the electrical devices ED1 and ED2 include a gear-changing device, an adjustable seatpost, a suspension, and an assist driving unit. However, the operating device 10 can be configured to be electrically connected to the electrical devices ED1 and ED2 through at least one of the wireless communication channel and the wired communication channel. At least one of the electrical devices ED1 and ED2 can be omitted from the human-powered vehicle 2 if needed and/or desired.

The base member 12 includes a power source holder PS21. The power source holder PS21 is configured to detachably hold an electric power source PS22. Examples of the electric power source PS22 include a primary battery and a secondary battery. The power source holder PS21 is provided to the second end portion 16 of the base member 12.

The term "detachably and reattachably," as used herein, encompasses a configuration in which an element is repeatedly detachable from and attachable to another element without substantial damage.

As seen in FIG. 1, the operating device 10 for the human-powered vehicle comprises an electronic component 50. The second end portion 16 includes an internal space 16S. The electronic component 50 is provided in the internal space 16S of the second end portion 16. However, the electronic component 50 can be provided in positions other than the second end portion 16 if needed and/or desired.

The base member 12 includes a base body 52 and an accommodating part 54. The accommodating part 54 includes the internal space 16S. The power source holder PS21 is attached to the accommodating part 54. The second end portion 16 includes the accommodating part 54 including the internal space 16S. The base body 52 is a separate member from the accommodating part 54. The accommodating part 54 is coupled to the base body 52 with fasteners. However, the accommodating part 54 can be integrally provided with the base body 52 as a one-piece unitary member if needed and/or desired. The power source holder PS21 can be integrally provided with at least one of the base body 52 and the accommodating part 54 if needed and/or desired.

The electronic component 50 includes an electronic controller 50A. The electronic controller 50A is provided to the second end portion 16 of the base member 12. The electronic controller 50A is provided in the internal space 16S. The electronic controller 50A is electrically connected to the power source holder PS21 to receive electricity from the electric power source PS22 via the power source holder PS21.

The electronic controller 50A includes a processor 50P, a memory 50M, a circuit board 50B, and a bus. Namely, the electronic component 50 includes the circuit board 50B. The processor 50P and the memory 50M are electrically mounted on the circuit board 50B. The processor 50P and the memory 50M are electrically connected to the circuit board 50B via the bus. The processor 50P is electrically connected to the memory 50M via the circuit board 50B and the bus.

For example, the processor 50P includes at least one of a central processing unit (CPU), a micro processing unit (MPU), and a memory controller. The memory 50M is electrically connected to the processor 50P. For example, the memory 50M includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a hard disc drive (HDD). The memory 50M includes storage areas each having an address. The processor 50P is configured to control the memory 50M to store data in the storage areas of the memory 50M and reads data from the storage areas of the memory 50M. The processor 50P can also be referred to as a hardware processor 50P. The memory 50M can also be referred to as a hardware memory 50M. The memory 50M can also be referred to as a computer-readable storage medium.

The electronic controller 50A is programmed to execute at least one control algorithm of the derailleur RD. The memory 50M (e.g., the ROM) stores at least one program including at least one program instruction. The at least one program is read into the processor 50P, and thereby the at least one control algorithm of the derailleur RD is executed based on the at least one program. The electronic controller 50A can also be referred to as an electronic controller 50A circuit or circuitry. The electronic controller 50A can also be referred to as a hardware electronic controller 50A.

The structure of the electronic controller 50A is not limited to the above structure. The structure of the electronic controller 50A is not limited to the processor 50P, the memory 50M, and the bus. The electronic controller 50A can be realized by hardware alone or a combination of hardware and software. The processor 50P and the memory 50M can be integrated as a one chip such as an application specific integrated circuit (ASIC) or a field programmable gate array (FPGA).

The electronic component 50 includes a communicator 50C. The communicator 50C is provided to the second end portion 16 of the base member 12. The communicator 50C is provided in the internal space 16S. The communicator 50C is electrically connected to the power source holder PS21 to receive electricity from the electric power source PS22 via the power source holder PS21. The communicator 50C is electrically mounted on the circuit board 50B of the electronic controller 50A.

In the present embodiment, the processor 50P and the memory 50M of the electronic controller 50A is provided between the circuit board 50B and the electric power source PS22. The communicator 50C is provided between the circuit board 50B and the electric power source PS22. However, each of the processor 50P, the memory 50M, and the communicator 50C can be provided in positions other than the illustrated positions if needed and/or desired.

The operating device 10 includes switches SW1, SW2, and SW3. The switches SW1 and SW2 are mounted on the operating member 24. The switch SW3 is mounted on the base member 12. However, the switches SW1, SW2, and SW3 can be provided in positions other than the illustrated positions if needed and/or desired. At least one of the switches SW1, SW2, and SW3 can be omitted from the operating device 10.

The communicator 50C is configured to communicate with another device such as the electrical devices ED1 and ED2. In the present embodiment, the communicator 50C is configured to wirelessly communicate with at least one of the electrical devices ED1 and ED2. However, the communicator 50C can be configured to communicate with at least one of the electrical devices ED1 and ED2 via an electric cable if needed and/or desired.

The operating device 10 includes an electrical connector 58 to which an electric cable is to be detachably and reattachably connected. The electrical connector 58 is electrically connected to the communicator. The communicator 50C can be configured to communicate with another device via the electrical connector 58 and the electrical cable using a power line communication (PLC).

The electronic controller 50A is electrically connected to the switches SW1, SW2, and SW3. The electronic controller 50A is configured to generate a control signal CS1 in response to a user input received by the switch SW1. The electronic controller 50A is configured to generate a control signal CS2 in response to a user input received by the switch SW2. The electronic controller 50A is configured to generate a control signal CS3 in response to a user input received by the switch SW3. The electronic controller 50A is configured to control the communicator 50C to transmit the control signal CS1. The electronic controller 50A is configured to control the communicator 50C to transmit the control signal CS2. The electronic controller 50A is configured to control the communicator 50C to transmit the control signal CS3. The control signals CS1 and CS2 indicates upshifting and downshifting of the electrical device ED1 in a case where the electrical device ED1 includes a gear changing device. The control signal CS3 indicates an adjustable state in a case where the electrical device ED2 includes an adjustable seatpost. The control signals CS1, CS2, and CS3 can indicate other actions of other devices if needed and/or desired.

As seen in FIG. 1, the operating device 10 for the human-powered vehicle comprises a reinforcement member 60. The reinforcement member 60 is coupled to the base member 12 to reinforce the base member 12. The reinforcement member 60 is coupled to the second end portion 16. The reinforcement member 60 is coupled to the second end portion 16 to reinforce the second end portion 16. The reinforcement member 60 is closer to the second end portion 16 than the pivot axis A1. The reinforcement member 60 is closer to the second end portion 16 than the first end portion 14. However, the positional relationship between the reinforcement member 60, the first end portion 14, the second end portion 16, and the pivot axis A1 is not limited to the illustrated embodiment.

Figure 2:
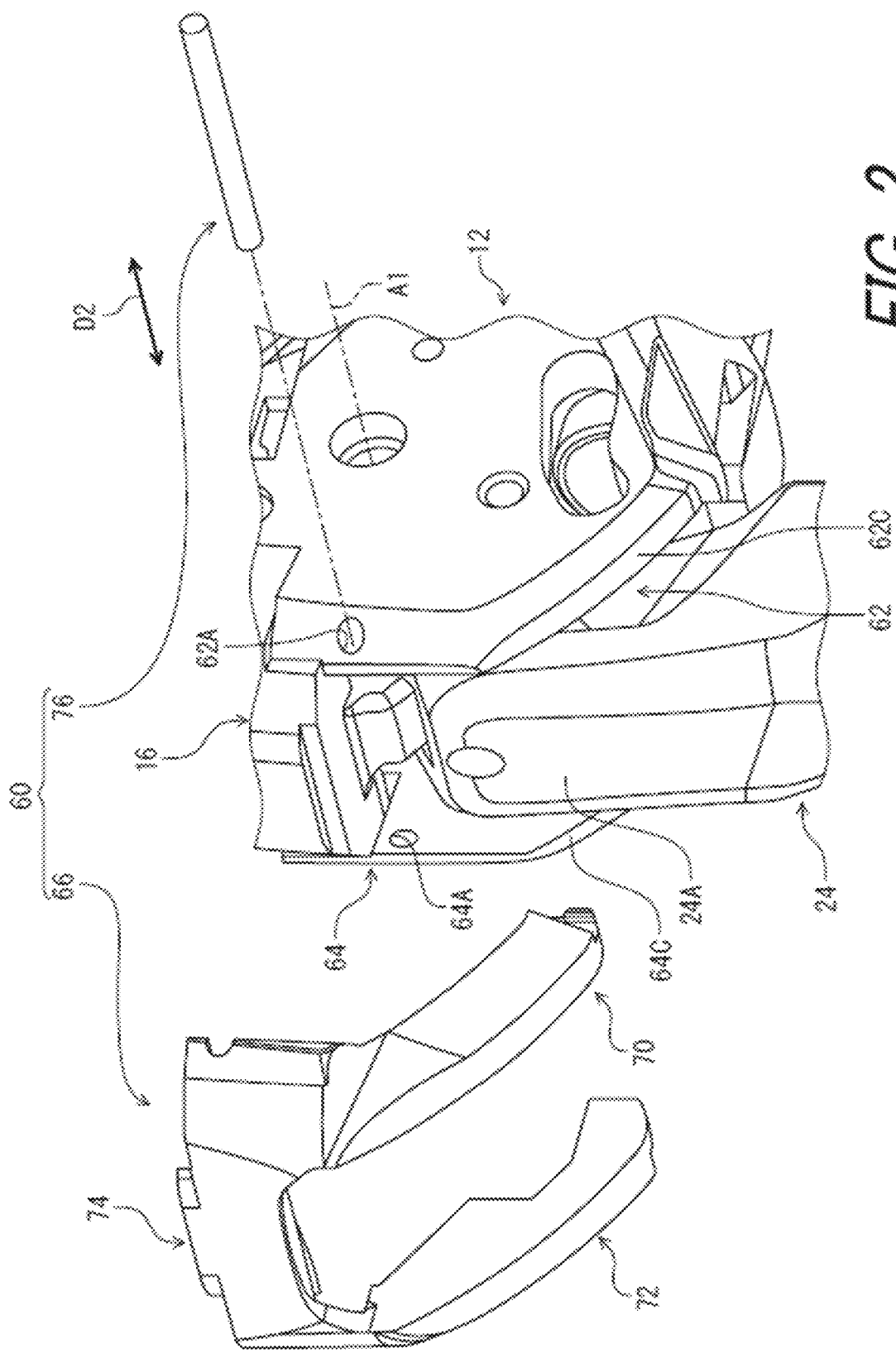
FIG. 2 is an exploded perspective view of the operating device illustrated in FIG. 1.

As seen in FIG. 2, the reinforcement member 60 is a separate member from the base member 12 and the operating member 24. The reinforcement member 60 is a separate member from the second end portion 16. The reinforcement member 60 is attached to the second end portion 16. Parts other than the base member 12, the operating member 24, and the reinforcement member 60 are omitted from FIG. 2.

The base body 52 includes a first support 62 and a second support 64. The second end portion 16 includes the first support 62 and the second support 64. The second support 64 is spaced apart from the first support 62 in an axial direction D2 defined along the pivot axis A1. The operating member 24 is at least partially provided between the first support 62 and the second support 64 in the axial direction D2. The operating member 24 is at least partially provided between the first support 62 and the second support 64 in at least one of the rest state and the operated state.

In the present embodiment, the operating member 24 is partially provided between the first support 62 and the second support 64 in each of the rest state and the operated state. However, the operating member 24 can be entirely provided between the first support 62 and the second support 64 in at least one of the rest state and the operated state if needed and/or desired.

The reinforcement member 60 includes a reinforcement frame 66. The reinforcement frame 66 couples the first support 62 and the second support 64. The reinforcement frame 66 includes a first frame part 70, a second frame part 72, and a third frame part 74. The second frame part 72 is spaced apart from the first frame part 70 in the axial direction D2. The first frame part 70 is coupled to the first support 62. The second frame part 72 is coupled to the second support 64. The third frame part 74 is provided between the first frame part 70 and the second frame part 72. The third frame part 74 couples the first frame part 70 and the second frame part 72. The third frame part 74 is integrally provided with at least one of the first frame part 70 and the second frame part 72 as a one-piece unitary member. In the present embodiment, the third frame part 74 is integrally provided with the first frame part 70 and the second frame part 72 as a one-piece unitary member. However, the third frame part 74 can be a separate member from at least one of the first frame part 70 and the second frame part 72 if needed and/or desired.

The first support 62 includes a first curved part 62C. The second support 64 includes a second curved part 64C. The first frame part 70 is coupled to the first curved part 62C. The second frame part 72 is coupled to the second curved part 64C. The first frame part 70 extends along the first curved part 62C. The second frame part 72 extends along the second curved part 64C.

The reinforcement member 60 includes a reinforcement rod 76. The reinforcement rod 76 is configured to couple the reinforcement frame 66 to the second end portion 16 of the base member 12. The reinforcement rod 76 is a separate member from the reinforcement frame 66. However, the reinforcement rod 76 can be integrally provided with the reinforcement frame 66 as a one-piece unitary member if needed and/or desired.

Figure 3:
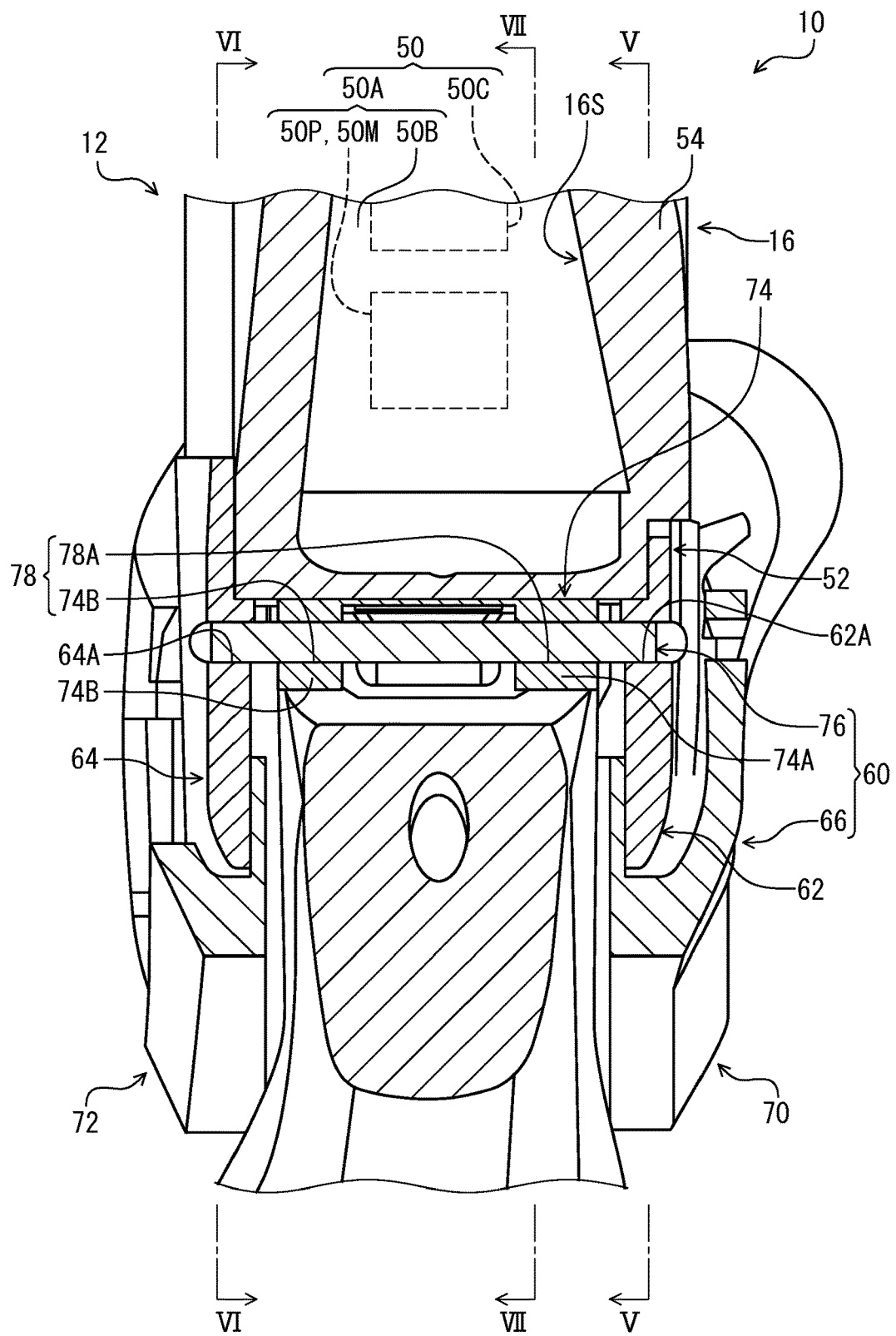
FIG. 3 is a cross-sectional view of the operating device taken along line of FIG. 5.

As seen in FIG. 3, the reinforcement rod 76 couples the first support 62 and the second support 64. The first support 62 includes a first hole 62A. The second support 64 includes a second hole 64A. The reinforcement rod 76 extends through the first hole 62A and the second hole 64A. The reinforcement frame 66 is coupled to the first support 62 and the second support 64 via the reinforcement rod 76. The third frame part 74 is coupled to the first support 62 and the second support 64 via the reinforcement rod 76. The first hole 62A extends in the axial direction D2. The second hole 64A extends in the axial direction D2. The reinforcement rod 76 extends in the axial direction D2 in a coupled state where the reinforcement member 60 is coupled to the second end portion 16. Parts other than the base member 12, the operating member 24, the electronic component 50, and the reinforcement member 60 are omitted from FIG. 3.

Figure 4:
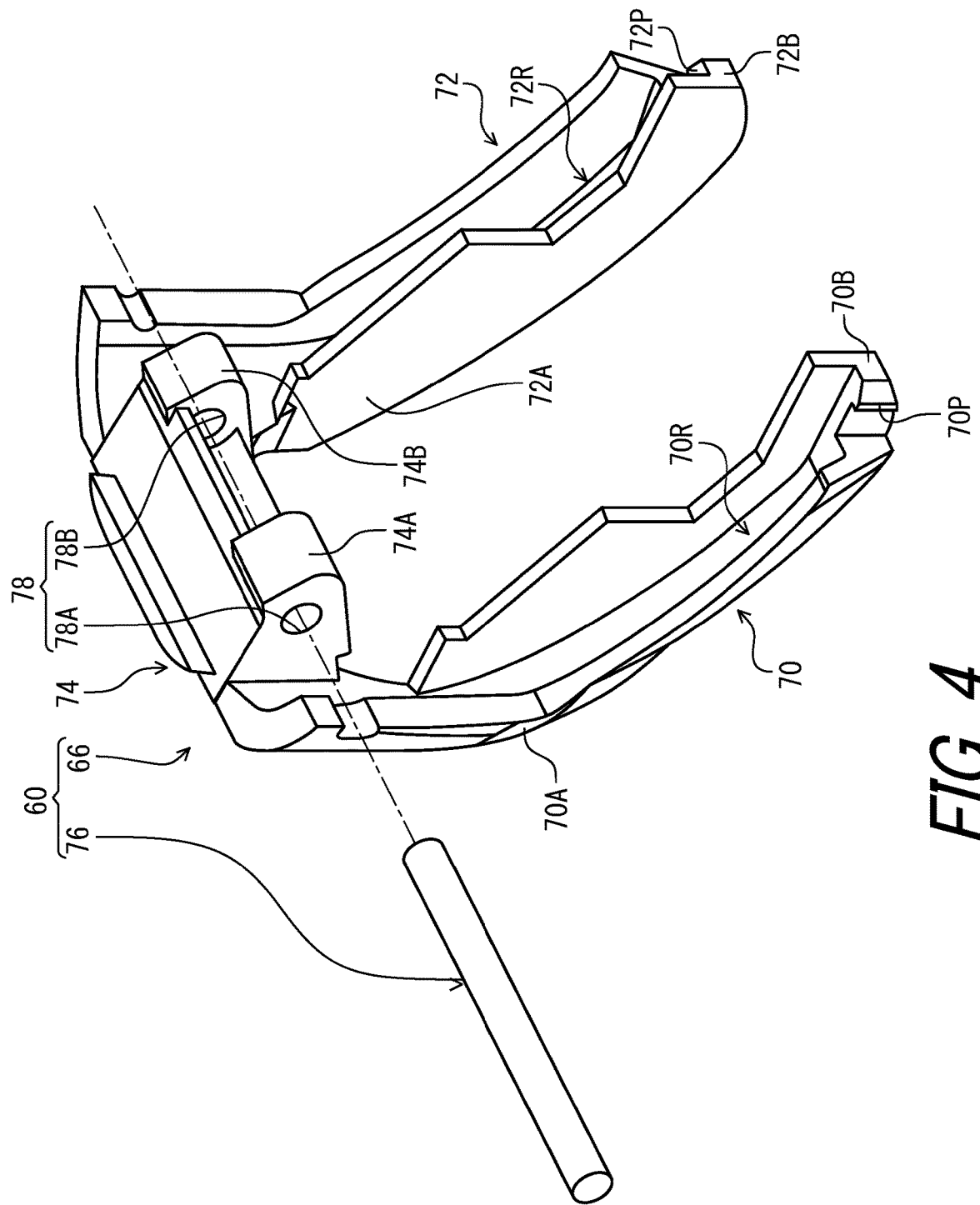
FIG. 4 is an exploded perspective view of a reinforcement member of the operating device illustrated in FIG. 1.

As seen in FIG. 4, the reinforcement frame 66 includes a coupling hole 78. The reinforcement rod 76 extends through the coupling hole 78 of the reinforcement frame 66. The third frame part 74 includes the coupling hole 78. The coupling hole 78 extends in the axial direction D2 in the coupled state.

The third frame part 74 includes a first coupling part 74A and a second coupling part 74B. The second coupling part 74B is spaced apart from the first coupling part 74A in the axial direction D2. The coupling hole 78 includes a first coupling hole 78A and a second coupling hole 78B. The first coupling part 74A includes the first coupling hole 78A. The second coupling part 74B includes the second coupling hole 78B. The first coupling part 74A and the second coupling part 74B can be formed as a single part if needed and/or desired.

As seen in FIG. 3, the reinforcement member 60 is at least partially provided between the first support 62 and the second support 64 in the axial direction D2. The reinforcement frame 66 is at least partially provided between the first support 62 and the second support 64 in the axial direction D2. The third frame part 74 is at least partially provided between the first support 62 and the second support 64 in the axial direction D2. The first coupling part 74A is at least partially provided between the first support 62 and the second support 64 in the axial direction D2. The second coupling part 74B is at least partially provided between the first support 62 and the second support 64 in the axial direction D2.

In the present embodiment, the reinforcement member 60 is partially provided between the first support 62 and the second support 64 in the axial direction D2. The reinforcement frame 66 is partially provided between the first support 62 and the second support 64 in the axial direction D2. The third frame part 74 is partially provided between the first support 62 and the second support 64 in the axial direction D2. The first coupling part 74A is entirely partially provided between the first support 62 and the second support 64 in the axial direction D2. The second coupling part 74B is entirely provided between the first support 62 and the second support 64 in the axial direction D2.

However, the reinforcement member 60 can be entirely provided between the first support 62 and the second support 64 in the axial direction D2 if needed and/or desired. The reinforcement frame 66 can be entirely provided between the first support 62 and the second support 64 in the axial direction D2 if needed and/or desired. The third frame part 74 can be entirely provided between the first support 62 and the second support 64 in the axial direction D2 if needed and/or desired. The first coupling part 74A can be partially provided between the first support 62 and the second support 64 in the axial direction D2 if needed and/or desired. The second coupling part 74B can be partially provided between the first support 62 and the second support 64 in the axial direction D2 if needed and/or desired.

The accommodating part 54 is coupled to at least one of the first support 62 and the second support 64. The accommodating part 54 is a separate member from at least one of the first support 62 and the second support 64.

In the present embodiment, the accommodating part 54 is coupled to each of the first support 62 and the second support 64. The accommodating part 54 is a separate member from each of the first support 62 and the second support 64. The reinforcement member 60 is partially provided between the accommodating part 54 and the operating member 24. However, the accommodating part 54 can be coupled to only one of the first support 62 and the second support 64 if needed and/or desired. The accommodating part 54 cam be integrally provided with at least one of the first support 62 and the second support 64 as a one-piece unitary member if needed and/or desired. The reinforcement member 60 can be entirely provided between the accommodating part 54 and the operating member 24 if needed and/or desired.

As seen in FIG. 4, the first frame part 70 includes a first recess 70R. The first frame part 70 includes a first frame part end 70A and a first additional frame part end 70B. The first frame part 70 extends from the first frame part end 70A to the first additional frame part end 70B. The first frame part end 70A is coupled to the third frame part 74. The first recess 70R extends from the first frame part end 70A to the first additional frame part end 70B. The first frame part 70 includes a first protrusion 70P. The first protrusion 70P is provided at the first additional frame part end 70B.

The second frame part 72 includes a second recess 72R. The second frame part 72 includes a second frame part end 72A and a second additional frame part end 72B. The second frame part 72 extends from the second frame part end 72A to the second additional frame part end 72B. The second frame part end 72A is coupled to the third frame part 74. The second recess 72R extends from the second frame part end 72A to the second additional frame part end 72B. The second frame part 72 includes a second protrusion 72P. The second protrusion 72P is provided at the second additional frame part end 72B.

Figure 5:
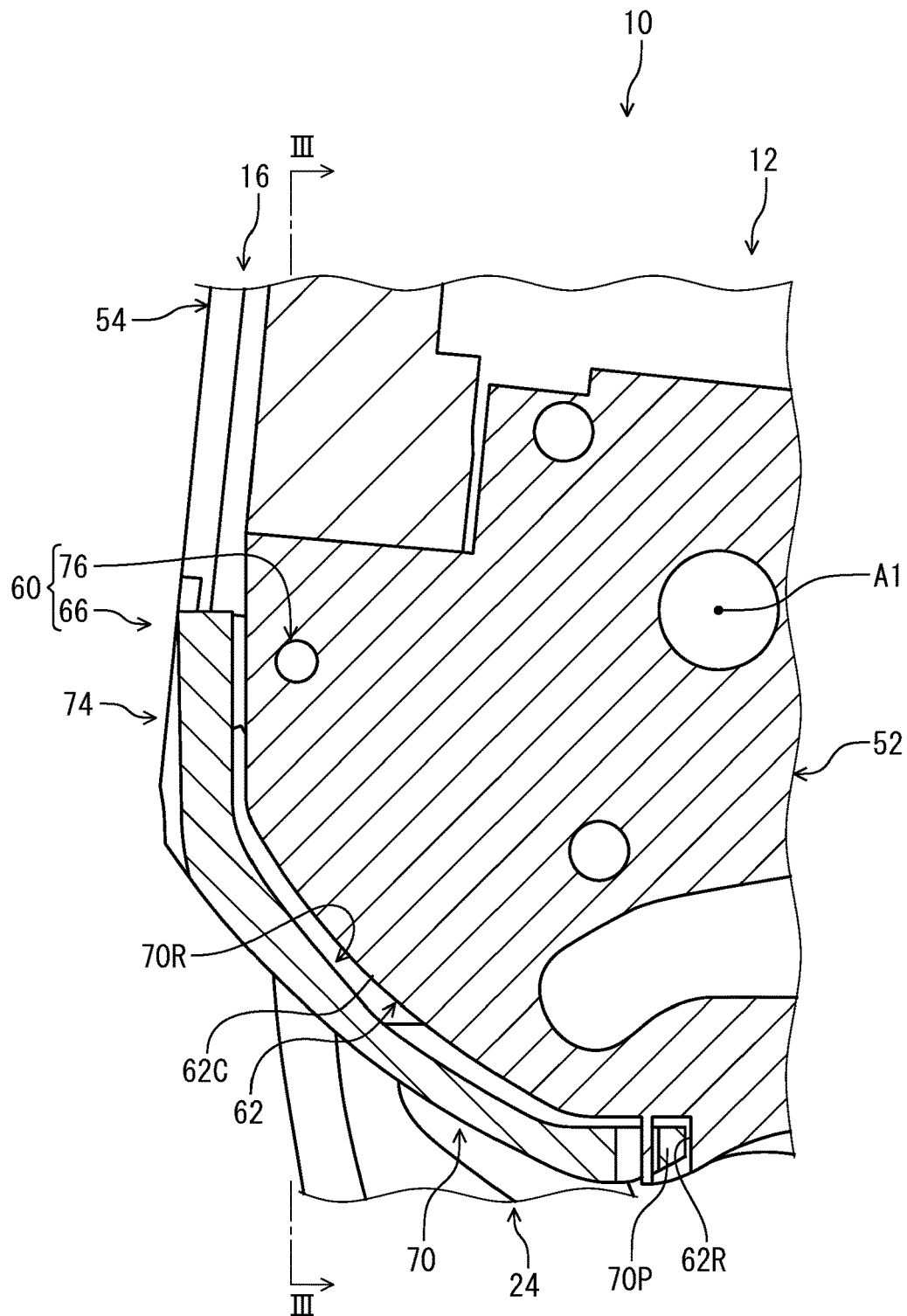
FIG. 5 is a cross-sectional view of the operating device taken along line V-V of FIG. 3.

As seen in FIG. 5, the first support 62 is at least partially provided in the first recess 70R in the coupled state. The first curved part 62C is at least partially provided in the first recess 70R in the coupled state. In the present embodiment, the first support 62 is partially provided in the first recess 70R in the coupled state. The first curved part 62C is partially provided in the first recess 70R in the coupled state. However, the first support 62 can be entirely provided in the first recess 70R in the coupled state if needed and/or desired. The first curved part 62C can be entirely provided in the first recess 70R in the coupled state if needed and/or desired.

The first support 62 includes a first coupling recess 62R. The first protrusion 70P is provided in the first coupling recess 62R in the coupled state. The first protrusion 70P and the first coupling recess 62R constitute a snap-fit. The first protrusion 70P is configured to restrict the reinforcement member 60 from moving away from the base member 12 in the longitudinal direction D1. The first frame part 70 can be coupled to the first support 62 with structures other than the snap-fit if needed and/or desired. Parts other than the base member 12, the operating member 24, the electronic component 50, and the reinforcement member 60 are omitted from FIG. 5.

Figure 6:
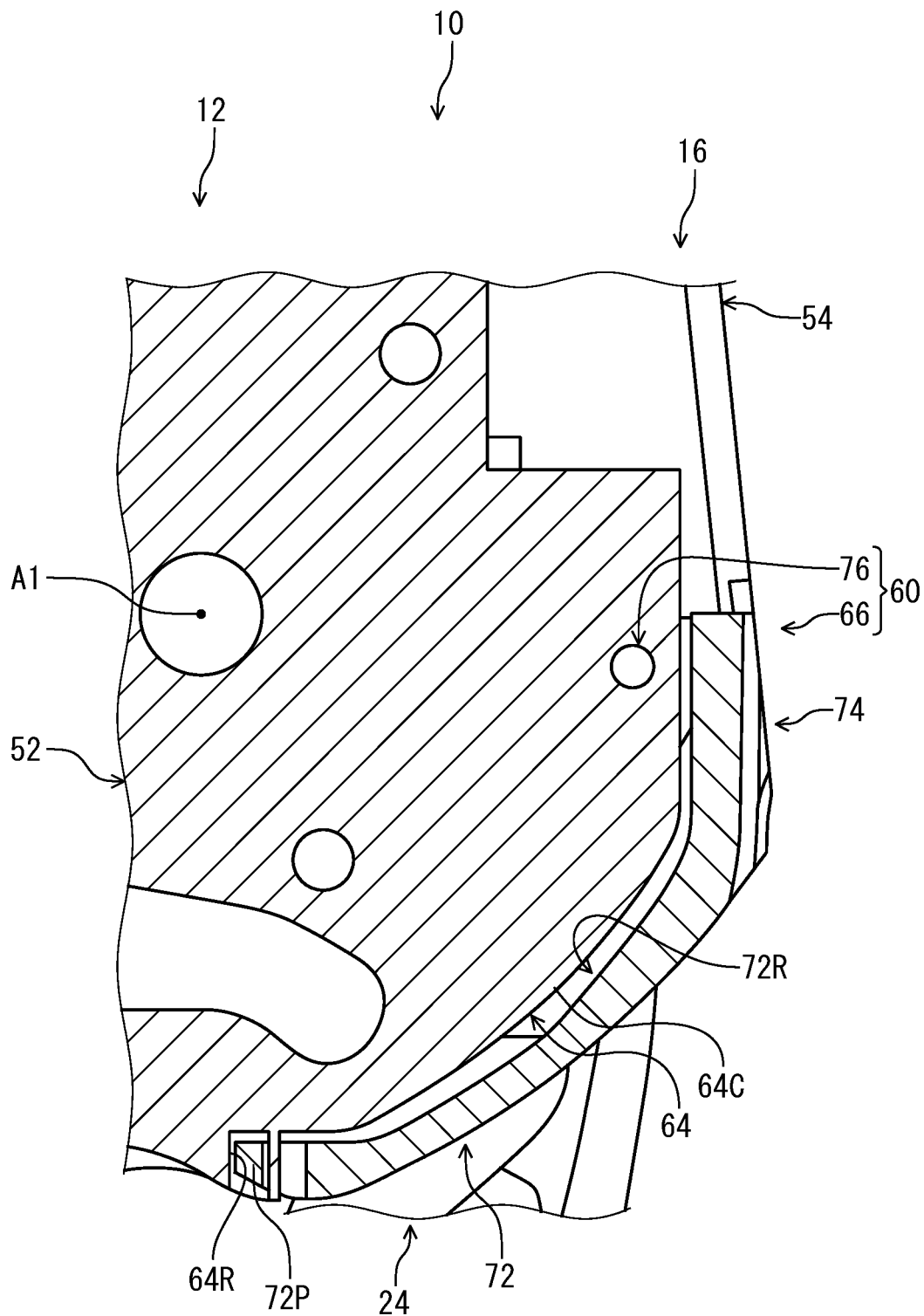
FIG. 6 is a cross-sectional view of the operating device taken along line VI-VI of FIG. 3.

As seen in FIG. 6, the second support 64 is at least partially provided in the second recess 72R in the coupled state. The second curved part 64C is at least partially provided in the second recess 72R in the coupled state. In the present embodiment, the second support 64 is partially provided in the second recess 72R in the coupled state. The second curved part 64C is partially provided in the second recess 72R in the coupled state. However, the second support 64 can be entirely provided in the second recess 72R in the coupled state if needed and/or desired. The second curved part 64C can be entirely provided in the second recess 72R in the coupled state if needed and/or desired.

The second support 64 includes a second coupling recess 64R. The second protrusion is provided in the second coupling recess 64R in the coupled state. The second protrusion and the second coupling recess 64R constitute a snap-fit. The second protrusion is configured to restrict the reinforcement member 60 from moving away from the base member 12 in the longitudinal direction D1. The second frame part 72 can be coupled to the second support 64 with structures other than the snap-fit if needed and/or desired. Parts other than the base member 12, the operating member 24, the electronic component 50, and the reinforcement member 60 are omitted from FIG. 6.

Figure 7:
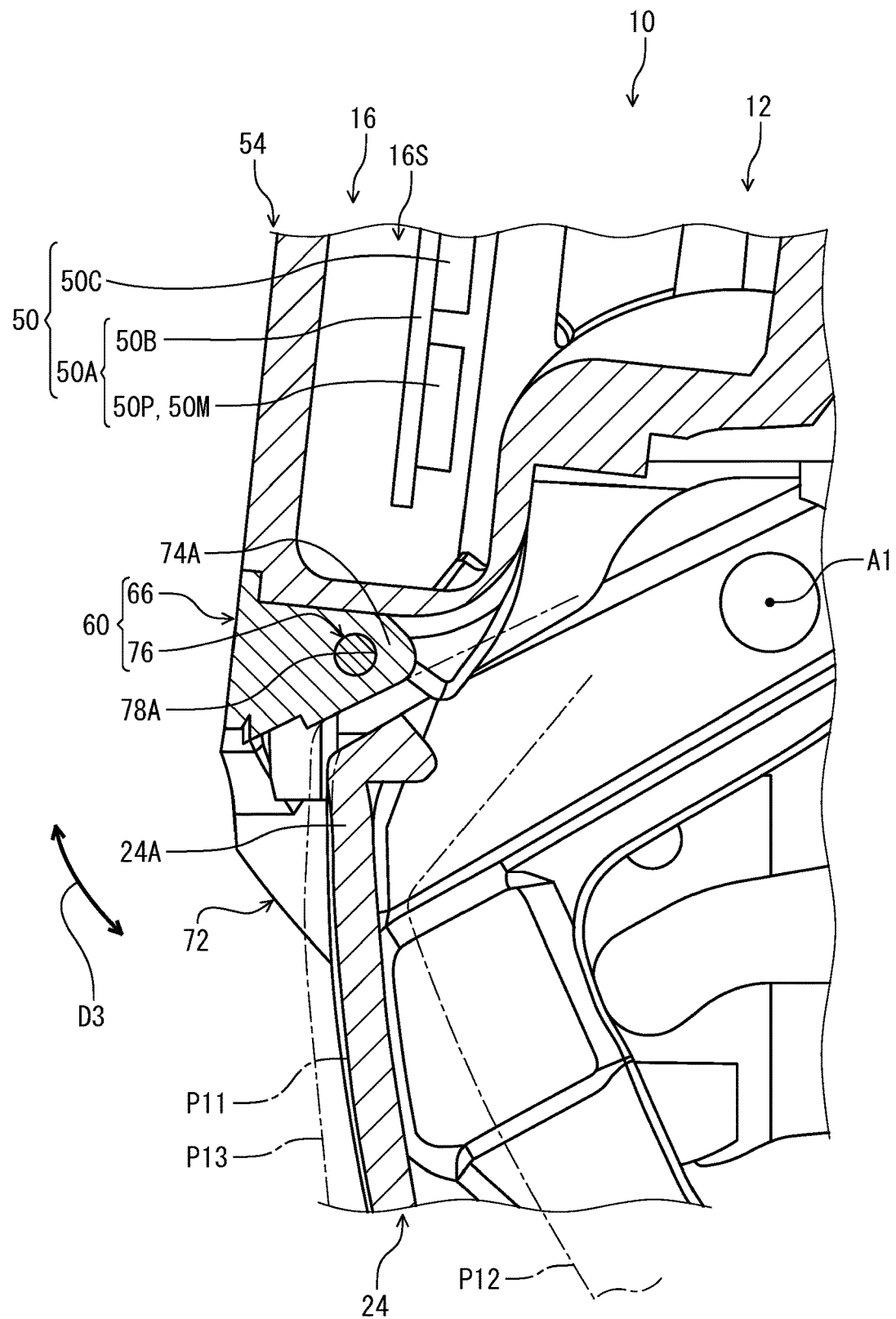
FIG. 7 is a cross-sectional view of the operating device taken along line VII-VII of FIG. 3.

As seen in FIGS. 3 and 7, the reinforcement member 60 is at least partially provided between the second end portion 16 and the operating member 24. The reinforcement member 60 is at least partially provided between the second end portion 16 and the operating member 24 in at least one of a rest state where the operating member 24 is in the rest position P11 and an operated state where the operating member 24 is in the operated position P12. The reinforcement member 60 is at least partially provided between the accommodating part 54 and the operating member 24. The reinforcement member 60 is at least partially provided between the accommodating part 54 and the operating member 24 in at least one of the rest state and the operated state. The reinforcement frame 66 is at least partially provided between the accommodating part 54 and the operating member 24 in at least one of the rest state and the operated state. The reinforcement rod 76 is at least partially provided between the accommodating part 54 and the operating member 24 in at least one of the rest state and the operated state.

In the present embodiment, the reinforcement member 60 is partially provided between the second end portion 16 and the operating member 24. The reinforcement member 60 is partially provided between the second end portion 16 and the operating member 24 in each of the rest state and the operated state. The reinforcement member 60 is partially provided between the accommodating part 54 and the operating member 24 in each of the rest state and the operated state. The reinforcement frame 66 is partially provided between the accommodating part 54 and the operating member 24 in each of the rest state and the operated state. The reinforcement rod 76 is partially provided between the accommodating part 54 and the operating member 24 in each of the rest state and the operated state.

However, the reinforcement member 60 can be entirely provided between the second end portion 16 and the operating member 24 if needed and/or desired. The reinforcement member 60 can be entirely provided between the second end portion 16 and the operating member 24 in at least one of the rest state and the operated state if needed and/or desired. The reinforcement member 60 can be entirely provided between the accommodating part 54 and the operating member 24 in at least one of the rest state and the operated state if needed and/or desired. The reinforcement frame 66 can be entirely provided between the accommodating part 54 and the operating member 24 in each of the rest state and the operated state if needed and/or desired. The reinforcement rod 76 can be entirely provided between the accommodating part 54 and the operating member 24 in each of the rest state and the operated state if needed and/or desired.

In the present embodiment, the reinforcement member 60 is harder than the base member 12. Hardness of the reinforcement member 60 is higher than hardness of the base member 12. Hardness of the reinforcement frame 66 is higher than the hardness of the base member 12. Hardness of the reinforcement rod 76 is higher than the hardness of the base member 12. However, the reinforcement member 60 can be as hard as the base member 12 if needed and/or desired. The hardness of the reinforcement member 60 can be equal to the hardness of the base member 12 if needed and/or desired. The hardness of the reinforcement frame 66 can be equal to the hardness of the base member 12 if needed and/or desired. The hardness of the reinforcement rod 76 can be equal to the hardness of the base member 12 if needed and/or desired.

The reinforcement member 60 is made of a metallic material. The reinforcement frame 66 is made of a metallic material. The reinforcement rod 76 is made of a metallic material. Examples of the metallic material of the reinforcement member 60 include iron, aluminum, stainless steel, and titan. In the present embodiment, the reinforcement member 60 is made of iron. The reinforcement frame 66 is made of iron. The reinforcement rod 76 is made of iron. However, the reinforcement member 60 can be made of materials other than iron if needed and/or desired. The reinforcement frame 66 can be made of materials other than iron if needed and/or desired. The reinforcement rod 76 can be made of materials other than iron if needed and/or desired. The reinforcement member 60 can be made of a metallic material if needed and/or desired.

The base member 12 is made of a material different from the metallic material of the reinforcement member 60. Hardness of the material of the reinforcement member 60 is higher than hardness of the material of the base member 12. The base member 12 is at least partially made of a non-metallic material. The base body 52 is made of a non-metallic material. The accommodating part 54 is made of a non-metallic material. Examples of the non-metallic material include a resin material such as synthetic resin. In the present embodiment, the base member 12 is made of the resin material. The base body 52 is made of the resin material. The accommodating part 54 is made of the resin material. However, the base member 12 can be made of materials other than the resin material if needed and/or desired. The base body 52 can be made of materials other than the resin material if needed and/or desired. The accommodating part 54 can be made of materials other than the resin material if needed and/or desired.

The reinforcement member 60 is configured to contact the operating member 24. The reinforcement frame 66 is configured to contact the operating member 24. The third frame part 74 is configured to contact the operating member 24. The reinforcement member 60 is configured to contact the operating member 24 in a circumferential direction D3 defined about the pivot axis A1. The reinforcement frame 66 is configured to contact the operating member 24 in the circumferential direction D3. The reinforcement rod 76 is configured to contact the operating member 24 in the circumferential direction D3.

The reinforcement member 60 is spaced apart from the operating member 24 in a state where the operating member 24 is in the rest position P11. The reinforcement frame 66 is spaced apart from the operating member 24 in a state where the operating member 24 is in the rest position P11. The third frame part 74 is spaced apart from the operating member 24 in a state where the operating member 24 is in the rest position P11.

The reinforcement member 60 is configured to contact the proximal end 24A of the operating member 24 when the operating member 24 is moved from the rest position P11 away from the operated position P12 toward an additional position P13. The reinforcement member 60 is in contact with the proximal end 24A of the operating member 24 in a state where the operating member 24 is in the additional position P13. The rest position P11 is provided between the operated position P12 and the additional position P13.

In the present embodiment, the reinforcement frame 66 is configured to contact the proximal end 24A of the operating member 24 when the operating member 24 is moved from the rest position P11 away from the operated position P12 toward the additional position P13. The reinforcement frame 66 is in contact with the proximal end 24A of the operating member 24 in the state where the operating member 24 is in the additional position P13. However, the reinforcement frame 66 can be configured not to contact the proximal end 24A of the operating member 24 when the operating member 24 is moved from the rest position P11 away from the operated position P12 toward the additional position P13 if needed and/or desired. The reinforcement frame 66 can be configured to be spaced apart from the proximal end 24A of the operating member 24 in the state where the operating member 24 is in the additional position P13 if needed and/or desired.

The reinforcement rod 76 is configured not to contact the proximal end 24A of the operating member 24 when the operating member 24 is moved from the rest position P11 away from the operated position P12 toward the additional position P13. The reinforcement rod 76 is spaced apart from the proximal end 24A of the operating member 24 in the state where the operating member 24 is in the additional position P13. However, the reinforcement rod 76 can be configured to contact the proximal end 24A of the operating member 24 when the operating member 24 is moved from the rest position P11 away from the operated position P12 toward the additional position P13 if needed and/or desired. The reinforcement rod 76 can be in contact with the proximal end 24A of the operating member 24 in the state where the operating member 24 is in the additional position P13 if needed and/or desired. Parts other than the base member 12, the operating member 24, and the reinforcement member 60 are omitted from FIG. 7.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B"

encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human-powered vehicle, comprising:
    a base member including a first end portion and a second end portion and extending between the first end portion and the second end portion in a longitudinal direction, the first end portion being configured to be coupled to a vehicle body of the human-powered vehicle, the second end portion including an internal space;
    an operating member movably coupled to the base member;
    an electronic component provided in the internal space of the second end portion; and
    a reinforcement member coupled to the second end portion, the reinforcement member being a separate member from the second end portion, the reinforcement member being at least partially provided between the second end portion and the operating member.

2. The operating device according to claim 1, wherein
    the operating member is movable relative to the base member between a rest position and an operated position, and
    the reinforcement member is at least partially provided between the second end portion and the operating member in at least one of a rest state where the operating member is in the rest position and an operated state where the operating member is in the operated position.

3. The operating device according to claim 1, wherein
    the operating member is pivotally coupled to the base member about a pivot axis.

4. The operating device according to claim 3, wherein
    the second end portion includes a first support and a second support spaced apart from the first support in an axial direction defined along the pivot axis, and
    the reinforcement member is at least partially provided between the first support and the second support in the axial direction.

5. The operating device according to claim 4, wherein
    the operating member is at least partially provided between the first support and the second support in the axial direction.

6. The operating device according to claim 4, wherein
    the reinforcement member includes a reinforcement frame coupling the first support and the second support.

7. The operating device according to claim 6, wherein
    the reinforcement frame includes a first frame part, a second frame part, and a third frame part,
    the first frame part is coupled to the first support,
    the second frame part is coupled to the second support, and
    the third frame part is provided between the first frame part and the second frame part and couples the first frame part and the second frame part.

8. The operating device according to claim 7, wherein
    the third frame part is integrally provided with at least one of the first frame part and the second frame part as a one-piece unitary member.

9. The operating device according to claim 7, wherein
    the third frame part is at least partially provided between the first support and the second support in the axial direction.

10. The operating device according to claim 6, wherein
    the reinforcement member includes a reinforcement rod coupling the first support and the second support.

11. The operating device according to claim 10, wherein
    the first support includes a first hole,
    the second support includes a second hole, and
    the reinforcement rod extends through the first hole and the second hole.

12. The operating device according to claim 10, wherein
    the reinforcement frame includes a coupling hole, and
    the reinforcement rod extends through the coupling hole of the reinforcement frame.

13. The operating device according to claim 4, wherein
    the second end portion includes an accommodating part including the internal space, and
    the accommodating part is coupled to at least one of the first support and the second support.

14. The operating device according to claim 13, wherein
    the accommodating part is a separate member from at least one of the first support and the second support.

15. The operating device according to claim 13, wherein
    the reinforcement member is at least partially provided between the accommodating part and the operating member.

16. The operating device according to claim 3, wherein
    the reinforcement member is closer to the second end portion than the pivot axis.

17. The operating device according to claim 1, wherein
    the reinforcement member is harder than the base member.

18. The operating device according to claim 1, wherein
    the reinforcement member is made of a metallic material.

19. The operating device according to claim 1, wherein
    the reinforcement member is configured to contact the operating member.

20. The operating device according to claim 1, wherein
    the electronic component includes a circuit board.

21. The operating device according to claim 1, wherein
    the base member includes a grip portion provided between the first end portion and the second end portion.

22. The operating device according to claim 1, wherein
    the reinforcement member includes:
    a reinforcement rod coupled to the base member, and
    a reinforcement frame directly coupled to the reinforcement rod.

23. The operating device according to claim 1, wherein
the base member includes a base body and an accommodating part,
the accommodating part includes the internal space, and
the accommodating part is a separate member from the base body.
24. The operating device according to claim 23, wherein
the reinforcement member is a separate member from the accommodating part.
25. The operating device according to claim 23, wherein
the reinforcement member is located closer to a distal end of the operating member than the accommodating part is to the distal end of the operating member.

* * * * *